June 18, 1935.  J. W. KAYE  2,004,953
STEAM TRAP
Filed Feb. 27, 1933
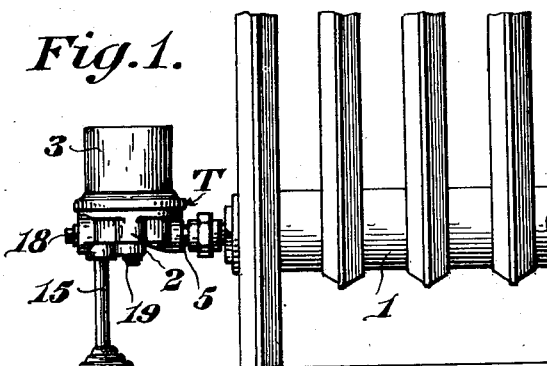
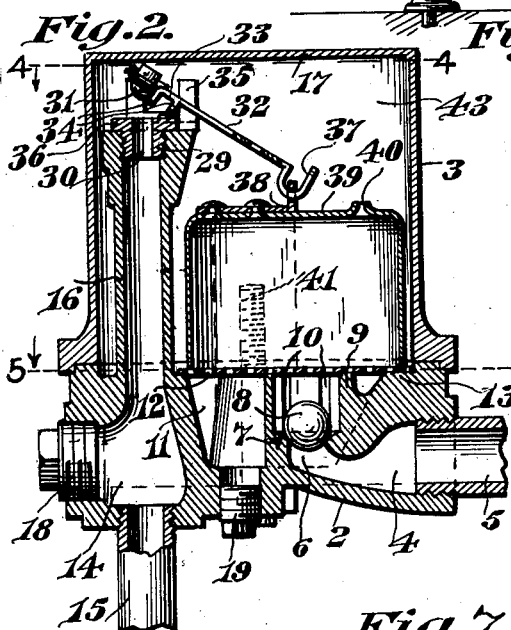
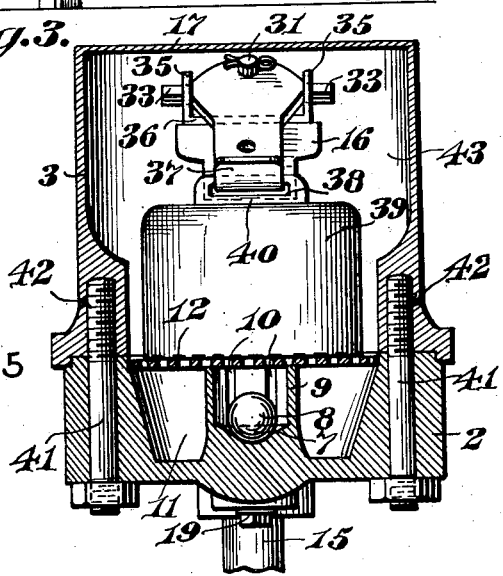
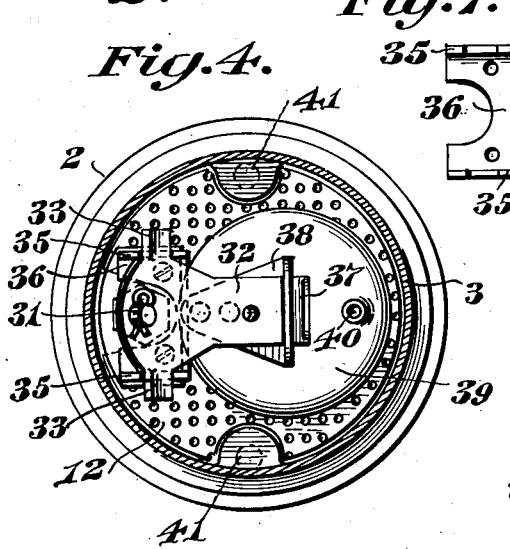
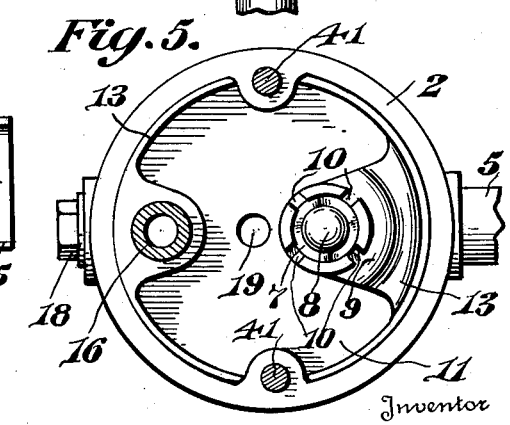
Inventor
James W. Kaye,
By Irving W. Cathran
Attorney Patented June 18, 1935

2,004,953

UNITED STATES PATENT OFFICE 2,004,953

STEAM TRAP

James W. Kaye, West Orange, N. J., assignor to Kaye & MacDonald, Inc., West Orange, N. J., a corporation of New Jersey Application February 27, 1933, Serial No. 658,863

4 Claims. (Cl. 137—103)

This invention relates to improvements in steam traps and has for its object the production of a simple and efficient trap wherein the outlet valve is operated by a float of the inverted bucket type.

One of the principal objects of the present invention is the production of an improved steam trap which is provided with a specially constructed base having an inlet port at one point and outlet ports located at another point in the base, the inlet port being controlled by an automatic check valve to prevent the return flow through the inlet port after incoming pressure has been released from the inlet port.

Another object of this invention is the production of a simple and efficient means for preventing a radiator from becoming air-bound and preventing air and water from being pulled back through the trap into the unit or system being drained when the system is shut off and cooled.

A further object of this invention is the production of a simple and efficient steam trap having a strainer for preventing the entrance of sediment and foreign matter into the trap and also providing a sediment collecting chamber, specially designed for preventing the accumulation of sediment within the body of said chamber or trap.

With these and other objects in view, this invention consists in certain novel constructions, combinations and arrangements of parts as will be hereinafter fully described and claimed.

In the drawing:

Figure 1 is a side elevation of a radiator unit showing the improved steam trap attached thereto;

Figure 2 is a vertical sectional view taken through the steam trap;

Figure 3 is a vertical sectional view taken at right angles to Figure 2;

Figure 4 is a section taken on line 4—4 of Figure 2;

Figure 5 is a section taken on line 5—5 of Figure 2;

Figure 6 is a bottom plan view of the bucket supporting lever; and

Figure 7 is a top plan view of the bracket which supports the bucket supporting lever.

By referring to the drawing, it will be seen that 1 designates the unit in the nature of the radiator to which the trap T is attached. The trap T comprises primarily two sections constituting a base 2 and a top or cap 3. The base 2 is provided with an inlet port 4 extending and communicating with the side of the base 2, as shown clearly in Figure 2, in which port 4 is connected or threaded a connecting pipe 5 leading to the radiator or other unit 1. The port 4 terminates in an upturned or upwardly extending inlet opening 6, which inlet opening 6 comprises a valve seat 7 upon which a ball valve 8 is adapted to normally rest. The base 2 is provided with an upstanding collar 9 projecting vertically of the valve seat 7, and this collar 9 is provided with spaced vertically extending slots 10 to permit the passage of steam or liquid through the slots 10 as the ball valve 8 is raised from its seat.

The base 2 is also provided with a sediment chamber 11 located adjacent the upstanding collar 9 and a suitable strainer screen 12 is fitted snugly upon the top of the base 2 so as to overhang the upstanding collar 9 and the sediment chamber 11, as clearly shown in Figure 2. The base 2 is preferably provided with a ledge 13 around its upper face to constitute an efficient seat for supporting the strainer screen 12, as shown clearly in Figure 2.

The base 2 is provided with outlet openings 14 and 18 to which are connected the drain pipe 15, the drain pipe 15 preferably extending in a vertical direction and also constituting an efficient support for the base 2. The outlet opening 14 communicates with a vertically extending neck 16, which neck 16 projects above the base 2, as clearly shown in Figure 2, and extends to a point in close proximity to the upper end 17 of the closure cap or casing 3. The drain or outlet opening 14 is provided in the side thereof with a suitable plug 18 for the purpose of facilitating the cleaning out of this opening should it be desired. It should be also understood that a choice of pipe connections may be provided by removing plug 18 and installing this plug in the opening 14. In this way there is provided a straight through connection, that is to say, the inlet and outlet will be in a straight line. A suitable plug 19 is carried by the base 2 and communicates with the sediment chamber 11 for the purpose of facilitating the cleaning out of this chamber when it is desired.

A suitable bushing 29 is carried by the upper end of the upstanding tube 16 which communicates with the outlet opening 14 and this bushing 29 is provided with an opening or port 30. This opening may be closed by means of the valve 31 carried by the inner end of the bucket supporting or engaging lever 32. This bucket supporting lever 32 is preferably provided with laterally extending arms 33 having a pair of spaced parallel flanges 34 upon the underfaces thereof for the purpose of providing a double fulcrum point. These arms 33 preferably fit within the bifurcated upstanding flanges 35 of the supporting brackets 36, which supporting brackets 36 are preferably supported in any suitable or desired manner upon the upper end of the upstanding tube 16, as shown clearly in Figures 2, 3 and 4, of the drawing. The outer end of the bucket supporting lever 32 is provided with a substantially U-shaped hook 37, which hook 37 passes through a slotted angle-bracket 38 carried by the upper end of the inverted bucket 39. The inverted bucket 39 is provided with a suitable vent opening 40, as shown. The connection of the bucket supporting lever 32, as described and illustrated, will provide a simple and efficient connection allowing for a proper and free movement of the bucket. When the bucket 39 is in its lowered position, it may rest snugly upon the draining screen 12, as shown in Figure 2.

As shown clearly in Figures 2 and 3, all of the working parts of the steam trap are preferably carried by the base 2, and the cover or cap 3 is removably secured to this base and none of the working parts are secured or connected to the cap. This cap or housing 3 is preferably secured to the base by means of suitable anchoring bolts 41 which pass up through the base 2 and fit into suitable threaded sockets 42 carried or formed in the lower end of the cap or housing 3, as shown clearly in Figure 3 of the drawing.

As shown in the drawing, the cap or housing 3 provides a floating chamber 43 in which the float 39 is free to operate for swinging the lever 32 to an open and closed position to permit the valve 31 to move into an open and closed position with respect to the port 30.

The operation of the device is as follows:—The condensate, steam, or air passes through the pipe 5 and through the port 6, thereby raising the ball valve 8, and then passes through the strainer screen 12 into the float chamber 43. The float will remain in its lowered position with a consequent open position of the valve 31 which controls the discharge port 14. When steam or air enters the float chamber, however, the float 39 will rise with a consequent closing of the discharge port by forcing the valve 31 to a closed position with respect to the opening 30, due to the swinging of the lever 32 upon its fulcrum.

When the steam of the unit is shut off, the unit or system will cool down and cause a vacuum. This condition will allow air or condensate to leak back through the trap and fill the steam compartment. Such a condition would necessarily require a long time to heat up the unit or system again and would be likely to cause the water hammer produced by the cold condensate.

Through the medium of the structure illustrated and described, particularly referring to the ball valve structure 8, this difficulty is overcome or eliminated since the ball valve will prevent the pulling back through the cap of the water and air since no water or air can be pulled back into the unit being drained when the system is shut off or cooled. As soon as the intake pressure is released from the port 4, the pressure from the return line would force the ball to its seat, or the vacuum in cooling unit would cause the ball to be held tight against its seat and prevent any leaking back through this seat 7 into the port 4. Through the medium of this structure a very simple and efficient automatic control has been provided thereby eliminating the difficulty which is experienced in many systems of this kind where it is necessary to first free the air or water before heat can pass through the system after the system has once cooled off.

It should be understood that a very simple and efficient structure has been produced which will permit the unit to stay hot for a greater length of time after the steam is shut off, and also will result in a saving of time in raising the temperature, particularly where radiator service is used employing a thermostatic regulating valve.

It should be understood that certain detail changes in the mechanical construction may be employed without departing from the spirit of the invention, so long as these changes fall within the scope of the appended claims.

Having described the invention, what is claimed as new is:—

1. A steam trap of the class described comprising a base having an inlet port, a check valve for automatically preventing the return flow through said inlet port when pressure is released therefrom, said base also having a sediment chamber formed adjacent said inlet port, a strainer screen extending over said sediment chamber and over the end of said inlet port, an outlet tube formed upon said base and projecting above the top of the base, a casing for housing said tube, a bucket valve mounted within said casing, said tube having a valve seat at its upper end, a lever connected to said bucket and provided with a valve for closing said last mentioned valve seat as said bucket is raised, and drain out means for said outlet tube.

2. A steam trap of the class described comprising a base having an inlet port, a check valve for normally preventing the return flow of liquid into said inlet port, said inlet port having a vertically extending discharge opening, said base having a sediment chamber located adjacent said inlet port, a strainer screen extending over said sediment chamber and inlet port for retaining said valve against accidental displacement, drain means for said sediment chamber, said base having an upwardly extending outlet tube projecting above the base, an outlet pipe communicating with the lower end of said tube, drain and cleanout means for said tube, a casing fitting snugly upon said base and projecting above said base and enclosing said outlet tube, said outlet tube having a valve seat at its upper end, a substantially U-shaped plate supported at the upper end of said tube, a rocking lever fulcrumed upon said plate, a valve carried by one end of said lever for opening and closing said last-mentioned valve seat, and an inverted bucket carried by the outer end of said lever.

3. A steam trap of the class described comprising a base having an inlet port, a check valve for normally preventing the return flow of liquid into said inlet port, said inlet port having a vertically extending discharge opening, said base having a sediment chamber located adjacent said inlet port, a strainer screen extending over said sediment chamber and inlet port for retaining said valve against accidental displacement, drain means for said sediment chamber, said base having an upwardly extending outlet tube projecting above the base, an outlet pipe communicating with the lower end of said tube, drain and cleanout means for said tube, a casing fitting snugly upon said base and projecting above said base and enclosing said outlet tube, said outlet tube having a valve seat at its upper end, a substantially U-shaped plate supported at the upper end of said tube, a rocking lever fulcrumed upon said plate, a valve carried by one end of said lever for opening and closing said last-mentioned valve seat, said lever having a substantially U-shaped hooked outer end, and an inverted bucket mounted within said casing, said inverted bucket having an apertured angle bracket secured thereto, said hooked end of said lever passing through said apertured angle bracket for loosely connecting said bucket valve with said lever.

4. A steam trap of the class described comprising a base having an inlet port, means for automatically controlling the flow through said inlet port, an upwardly extending outlet tube projecting above the top of the base, said tube having a valve seat at its upper end, a lever fulcrumed upon the upper end of said tube, an inverted bucket valve suspended from one end of said lever, a valve carried by the opposite end of said lever for closing the valve seat at the upper end of said outlet tube as said bucket is raised, the inverted bucket valve normally hanging below the upper end of said outlet tube, and a casing housing said outlet tube.

JAMES W. KAYE.